United States Patent
Goulakov et al.

(10) Patent No.: US 8,649,245 B2
(45) Date of Patent: Feb. 11, 2014

(54) DIRECT WAVEGUIDE LIGHT DELIVERY TO NFT FOR HEAT ASSISTED MAGNETIC RECORDING

(75) Inventors: Arkadi Goulakov, Fremont, CA (US); Kaizhong Gao, Eden Prairie, MN (US); Xuhui Jin, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 391 days.

(21) Appl. No.: 12/749,102

(22) Filed: Mar. 29, 2010

(65) Prior Publication Data

US 2011/0235480 A1    Sep. 29, 2011

(51) Int. Cl.
*G11B 11/00* (2006.01)

(52) U.S. Cl.
USPC .................................. 369/13.33; 369/13.13

(58) Field of Classification Search
USPC ........ 369/13.33, 13.13, 13.32, 13.02, 112.09, 369/112.14, 112.21, 112.27, 300; 360/59; 385/129, 31, 88–94; 29/603.01–603.27; 250/201.3, 201.5
See application file for complete search history.

(56) References Cited

U.S. PATENT DOCUMENTS

| | | | |
|---|---|---|---|
| 6,108,478 A | 8/2000 | Harpin et al. | |
| 6,795,630 B2 | 9/2004 | Challener et al. | |
| 6,980,374 B1 | 12/2005 | Schlesinger | |
| 7,155,732 B2 | 12/2006 | Rausch et al. | |
| 7,266,268 B2 | 9/2007 | Challener et al. | |
| 7,272,079 B2 | 9/2007 | Challener | |
| 7,310,206 B2 | 12/2007 | Liu et al. | |
| 7,412,143 B2 | 8/2008 | Rottmayer et al. | |
| 7,580,602 B2* | 8/2009 | Itagi et al. | 385/37 |
| 7,599,277 B1* | 10/2009 | Kato et al. | 369/112.27 |
| 8,223,459 B2* | 7/2012 | Gage et al. | 360/235.4 |
| 8,270,259 B2 | 9/2012 | Hirata et al. | |
| 8,351,306 B2* | 1/2013 | Hirata et al. | 369/13.33 |
| 8,385,159 B2* | 2/2013 | Gao et al. | 369/13.33 |
| 8,406,093 B2* | 3/2013 | Iwanabe et al. | 369/13.33 |
| 2004/0001394 A1* | 1/2004 | Challener et al. | 369/13.32 |
| 2005/0135008 A1* | 6/2005 | Challener et al. | 360/128 |
| 2006/0005216 A1 | 1/2006 | Rausch | |
| 2006/0133230 A1 | 6/2006 | Buechel et al. | |

(Continued)

FOREIGN PATENT DOCUMENTS

| | | |
|---|---|---|
| JP | 2008-152897 A | 7/2008 |
| WO | 2007-132766 A1 | 11/2007 |

OTHER PUBLICATIONS

Challener et al. "Light Delivery for Heat-Assisted Magnetic Recording." The Japan Society of Applied Physics. vol. 42. (Sep. 2002). pp. 981-988.

(Continued)

*Primary Examiner* — Tan X Dinh (74) *Attorney, Agent, or Firm* — HolzerIPLaw, PC (57) ABSTRACT

A magnetic recording head comprises a write pole having a pole tip adjacent to an air bearing surface, a return pole, an optical near field transducer positioned adjacent the pole tip and an air bearing surface for exposing a portion of a magnetic storage medium to high energy radiation. The energy is directly provided to the near field transducer by a ridge waveguide with tapered coupling elements, by a two dimensional straight or curved waveguide with a beveled end with a metal/dielectric coating for delivering energy to the near field transducer, or by a curved waveguide. The waveguide with tapered coupling elements or with beveled end can be fabricated by means of conventional wafer processing.

19 Claims, 10 Drawing Sheets

(56) References Cited

U.S. PATENT DOCUMENTS

| | | |
|---|---|---|
| 2006/0182939 A1 | 8/2006 | Goudarzi et al. |
| 2006/0232869 A1 | 10/2006 | Itagi et al. |
| 2008/0068748 A1 | 3/2008 | Olson et al. |
| 2008/0089187 A1 | 4/2008 | Suh et al. |
| 2008/0130155 A1 | 6/2008 | Naniwa et al. |
| 2008/0170319 A1 | 7/2008 | Seigler et al. |
| 2009/0073858 A1* | 3/2009 | Seigler et al. ............ 369/112.27 |
| 2009/0303858 A1 | 12/2009 | Kuiseko et al. |
| 2010/0061199 A1 | 3/2010 | Hirata et al. |
| 2010/0123965 A1* | 5/2010 | Lee et al. ................... 369/13.33 |
| 2010/0128577 A1* | 5/2010 | Kotani ....................... 369/13.33 |
| 2011/0096431 A1* | 4/2011 | Hellwig et al. ................. 360/59 |
| 2011/0164479 A1* | 7/2011 | Komura et al. ............ 369/13.33 |
| 2011/0181979 A1* | 7/2011 | Jin et al. ..................... 369/13.33 |
| 2011/0205661 A1* | 8/2011 | Komura et al. ............ 369/13.33 |
| 2011/0235480 A1* | 9/2011 | Goulakov et al. .......... 369/13.35 |
| 2012/0105996 A1* | 5/2012 | Katine et al. ................... 360/59 |
| 2012/0327751 A1* | 12/2012 | Iwanabe et al. ............ 369/13.33 |

OTHER PUBLICATIONS

Smythe et al. "Coupled Metallic Antenna Nanorod Arrays." Optical Society of America. (Apr. 2007).

Zheng et al. "Thermal oxide based silica ridge waveguide technology." Optics Express. vol. 12, No. 8, Apr. 2004.

Matsumoto et al. "Thermally Assisted Magnetic Recording." Fujitsu Sci. Tech. J 42 1, pp. 158-167 (Jan. 2006).

* cited by examiner

FIG. 11

DIRECT WAVEGUIDE LIGHT DELIVERY TO NFT FOR HEAT ASSISTED MAGNETIC RECORDING

BACKGROUND

The magnetic recording industry is progressing towards an aerial storage density of 1 Tb/inch². At recording densities of this magnitude, the bit size in the recording medium needs to be on the order of 25 nm to 50 nm. Magnetic recorded regions of this size are susceptible to the superparamagnetic limit wherein the magnetized regions (bits) are no longer thermally stable over reasonable time periods and recorded information can be lost. The size of a magnetized region that is affected by thermal instability is dictated by the following expression: $K_u V/k_B T > 0$ where $K_u$ is the magnetic crystalline anisotropy energy density of the material, V is the volume of the magnetized region, $k_B$ is the Boltzman constant, and T is the absolute temperature. As V decreases, $K_u$ needs to increase accordingly in order to maintain magnetic stability at ordinary temperatures. Materials do exist that have values of $K_u$ that support thermally stable bits at ordinary temperatures but their coercivities are too high to allow switching under the magnetic field generated by the 2.4 T writer poles on conventional read/write heads.

Heat assisted magnetic recording (HAMR) is a technique devised to overcome the difficulty in writing to materials with high $K_u$. In heat assisted magnetic recording, a beam of energy, typically visible, infrared or ultraviolet light, is directed to the surface of a magnetic recording medium in order to locally raise the temperature of a small region with nano dimensions to decrease the coercivity and allow switching of the magnetization of that region. Following switching, the heated region rapidly cools to room temperature where the high coercivity insures stability of the written bit.

Prior art methods of focusing optical energy into sub 50 nm size spots include the application of solid immersion lenses (SILs), solid immersion minors (SIMs) and other means of focusing coupled with a near field transducer at a focal point to concentrate and direct the energy to a small spot on a recording medium. Solid immersion lenses and solid immersion minors can be two dimensional planar waveguides with a predominantly parabolic shape such that an electromagnetic wave traveling in an axial direction through the waveguide is reflected off the edges of the waveguide due to an index mismatch between the waveguide and its immediate surroundings. The reflected waves concentrate at (or near) the focal point of the parabola. The diffraction limited spot size realized by SIMs and SILs with currently known transparent materials is greater than 80 nm, which is too large for heat assisted magnetic recording. To overcome this problem, optical near field transducers (NFTs) are employed to concentrate the energy at the recording medium. Optical NFTs are typically metal pins. If the electric field at the focal point is parallel to the axis of the pin, the field can couple with the pin and generate surface plasmons that travel along the surface of the pin and emerge as a small spot of concentrated energy much smaller than that of the focal point alone. When the optical NFT is proximate the air bearing surface of the recording head, a small spot with nano dimensions is heated on the recording medium.

Two dimensional SIMs and SILs are difficult to fabricate. There is a need for simpler methods of supplying energy to a near field transducer for heat assisted magnetic recording (HAMR).

SUMMARY

A recording head comprises a write pole having a pole tip adjacent an air bearing surface, a return pole, and an optical near field transducer positioned adjacent the air bearing surface for exposing a portion of a magnetic storage medium to near field radiation to assist magnetic writing. A waveguide is provided for delivering optical energy directly to the near field transducer.

A data storage device comprises a storage medium and a recording head for writing data to the storage medium. The recording head includes a ridge waveguide for delivering energy directly to a near field transducer, a write pole having a pole tip adjacent to an air bearing surface, a return pole, and an optical near field transducer positioned adjacent the air bearing surface for exposing a portion of the magnetic storage medium to high energy radiation.

A method of magnetic recording on magnetic storage medium using a recording head that includes a write pole having a pole tip adjacent an air bearing surface, a return pole, a waveguide, and an optical near field transducer positioned adjacent the write pole and the waveguide that, in turn, directly focuses the energy on the near field transducer that causes the near field transducer to emit evanescent radiation. The evanescent radiation, in turn, heats a portion of the magnetic storage medium while a write field produced by the write pole affects the magnetization of the portion of the magnetic storage medium.

BRIEF DESCRIPTION OF THE DRAWINGS

FIG. 4A' is a view of a waveguide cross section.

FIG. 4A" is a view of a waveguide cross section.

FIG. 6AA is an air bearing surface view of one aspect of the invention.

FIG. 6AAA is an air bearing surface view of another aspect of the invention.

FIG. 8AA is an air bearing surface view of another aspect of the invention.

DETAILED DESCRIPTION

Figure 1:
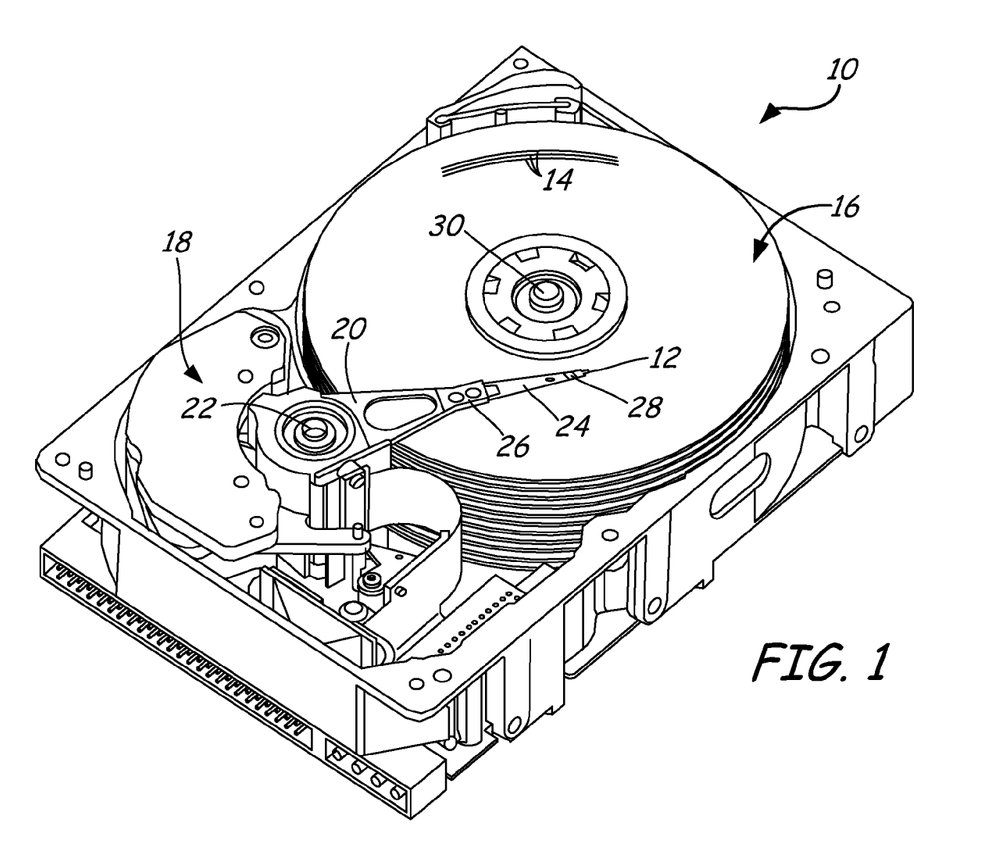
FIG. 1 is a perspective view of a magnetic disc drive that can include HAMR devices.

FIG. 1 is a perspective view of disc drive 10 including an actuation system for positioning slider 12 over track 14 of magnetic medium 16. The particular configuration of disc drive 10 is shown for ease of describing the present invention and is not intended to limit the scope of the present invention in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

A HAMR transducer includes a magnetic writer for generating a magnetic field to write to a magnetic medium (e.g. magnetic medium 16) and an optical device to heat a portion of the magnetic medium proximate to the write field. In the following description, FIG. 2 relates to the components and functionality of a HAMR magnetic writer. FIGS. 3 and 4A-4C relate to the components and functionality of an optical device. FIGS. 5A-11 relate to the components and functionality of other optical devices.

Figure 2:
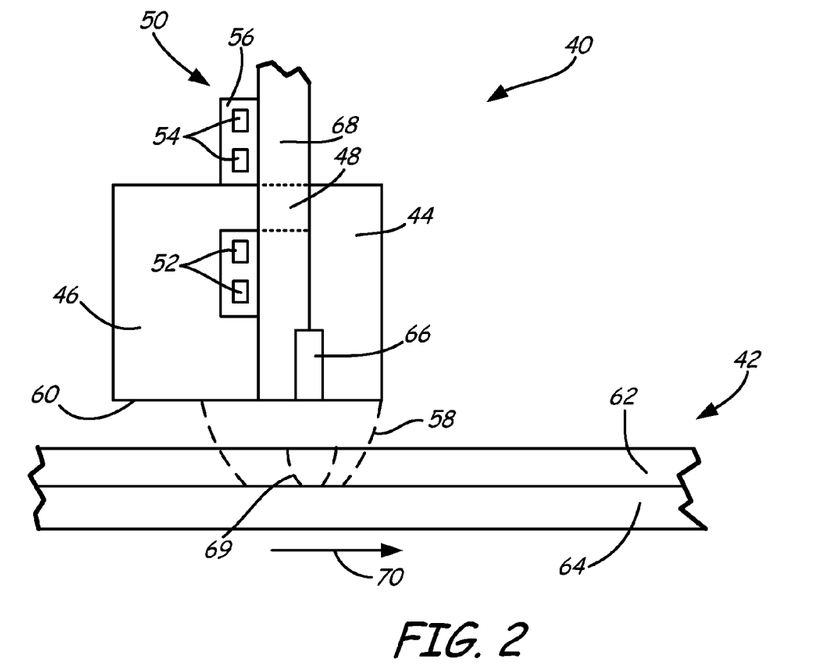
FIG. 2 is a cross sectional view of a perpendicular HAMR magnetic recording head and of an associated recording medium.

FIG. 2 is a cross sectional view of a portion of HAMR magnetic recording head 40 and a portion of associated magnetic storage medium 42. HAMR magnetic recording head 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned in write pole 44 proximate air bearing surface 60. Near field transducer 66 is coupled to waveguide 68 that receives an electromagnetic wave from an external source such as a laser. An electric field at the end of near field transducer 66 is used to heat a portion 69 of magnetically hard layer 62 to lower the coercivity so that the magnetic field from the write pole can affect the magnetization of the storage medium.

HAMR transducers can incorporate various waveguides such as mode index lenses or planar solid immersion mirrors or lenses to generate focused beams. In the example shown in FIG. 3, edge 80 of waveguide 68 is substantially parabolic in shape. A difference in refractive indices of materials internal and external to the waveguide allow reflection of electromagnetic waves at the waveguide boundaries. Electromagnetic waves 82 and 84 traveling along the longitudinal axis of the lens (waveguide 68) will be deflected at boundary 80 toward focal point 86 as shown. Diffraction gratings 83 and 85 or other means known in the art to couple external energy into waveguide 68 can be configured to minimize radiation traveling down the center of waveguide 68 and maximize the energy reflected from parabolic edge 80, thereby increasing the energy content of the longitudinal component of waves 82 and 84 impinging on the focal point.

The dimensions of the spot concentrated at focal point 86 of waveguide 68 are diffraction limited and alone are not sufficient for the sub 100 nm dimensions required for high areal density HAMR recording media. Near field transducers (NFTs) such as metallic pins, sphere/pin, disc/pin combinations and other means known in the art are required to focus the energy to acceptable sub 100 nm spot sizes. NFT 66 positioned at focal point 86 of waveguide 68 can couple with incident waves 82 and 84 to generate surface plasmons that propagate axially down NFT 66 until they exit as energy schematically shown in FIG. 3 as arrows 87 that heat a small region 69 of recording media 42.

Figure 3:
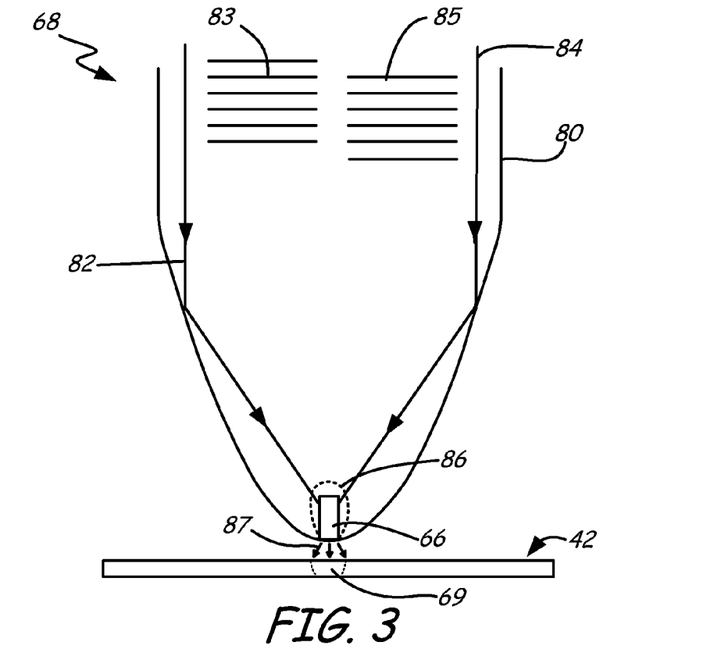
FIG. 3 is a schematic representation of a waveguide and a near field transducer proximate an associated recording medium.

Waveguide 68 can be made of, for example, a high index dielectric core material like $TiO_2$, $Ta_2O_5$, Si, SiN, or ZnS depending on the wavelength and refractive index desired. For example, Si has a very large index of 3.5 at a wavelength of 1550 nm in the near infrared, but it is not transparent to visible light. $Ta_2O_5$ has a lower index of about 2.1, and is transparent throughout the near infrared and visible. Waveguide 68 also contains dielectric cladding layers on either side of the core. Preferably, the difference in refractive index between core and cladding should be as large as possible. Air is a suitable dielectric for one side of the cladding for a solid immersion mirror. Other dielectrics that can be used for cladding layers for solid immersion mirrors include $SiO_2$ with an index of 1.5 and $Al_2O_3$ with an index of refraction of about 1.8.

One type of NFT comprises two and three dimensional metallic shapes in the form of pins, disc/pin, sphere/pin, and coupled nanorod configurations. Other configurations include "C" shape, "L" shape, and "bowtie" shape apertures in metallic films. These structures resonate when irradiated with properly designed incident electromagnetic radiation, whereby the resulting surface plasmons generated can illuminate minute areas of proximate surfaces with intense radiation. Generally, the structures are metallic shapes in an insulating environment. Planar NFTs are shaped metallic films with or without apertures depending on the orientation of the transducer with respect to the incident radiation.

Figure 4A:
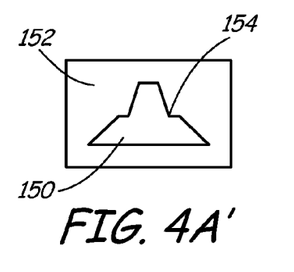
FIGS. 4A-4C are schematic illustrations of transducers.
Figure 4B:
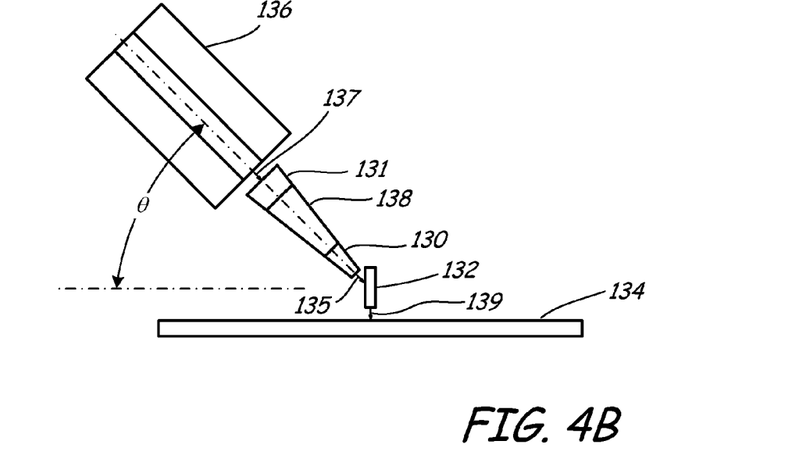
Figure 4C:
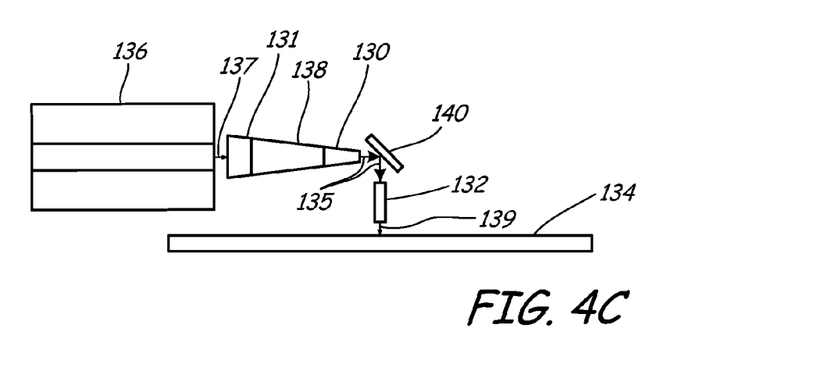

FIGS. 4A-4C illustrate one aspect of the invention to deliver energy from an energy source such as a laser or another waveguide to an optical near field transducer proximate a writer pole proximate a magnetic recording medium for heating a small region on the recording medium to assist magnetic writing for HAMR. The method comprises transmitting energy from the source to a near field transducer via a tapered waveguide. Preferably, the waveguide is a ridge waveguide with a core having a preferably multiple trapezoidal cross section. Coupling of an optical beam from an energy source such as a laser diode into a tapered waveguide can be performed by means of tapered coupling elements. The coupling elements change the optical mode of the laser output to match the optical mode in the device receiving the energy. Coupling elements are routinely positioned at each end of the tapered waveguide transmitting the energy toward a target such as a NFT. The preferred dimensions of the core of the tapered ridge waveguide such that the energy couples with an optical NFT at the end of the waveguide are reduced from about 5,000 nm by about 1,000 nm to about 500 nm to about 200 nm over a distance of about 100 micrometers.

FIG. 4A shows optical NFT 132, recording medium 134, energy source 136, and tapered ridge waveguide 138. Waveguide 138 has tapered coupling elements 130 and 131 at each end to facilitate energy transfer. Energy source 136 delivers electromagnetic energy, indicated by arrow 137, to tapered ridge waveguide 138 which, in turn, delivers energy to optical NFT 132 proximate magnetic write pole 44 of magnetic write head 40. NFT 132 concentrates the electromagnetic energy to a small spot on recording medium 134, indicated by arrow 139, to allow magnetic recording. Energy source 136 can be a laser diode or another waveguide. A single mode laser diode or single mode waveguide with the dimensions of optical mode not exceeding 5 microns is preferred.

Cross section A'A' of tapered waveguide 138 is shown in FIG. 4A' wherein waveguide 138 is a ridge waveguide. Core 150 is surrounded by cladding 152. The cross section of ridge waveguide core 150 resembles a stack of two trapezoids as shown wherein there is a single step 154 on the side of core 150. In other aspects, the core of tapered ridge waveguide 138 can comprise rectangular shapes. More trapezoidal or rectangular shapes can be stacked leading to a higher number of steps 154 on the side of ridge waveguide core 150. In another aspect, tapered waveguide 138 can be a thin film planar waveguide with a cross section as shown in FIG. 4A" wherein core 156 has a rectangular cross section.

Another approach to delivering energy to an optical NFT for HAMR is shown in FIG. 4B. In FIG. 4B, energy source 136 delivers energy to tapered waveguide 138 with coupling elements 130 and 131 as indicated by arrow 137. Waveguide 138, in turn, delivers energy to the surface of optical NFT 132 as indicated by arrow 135. Optical NFT 132, in turn, concentrates the electromagnetic energy to a small spot on recording medium 134, indicated by arrow 139, to assist magnetic recording by magnetic recording head 40. Angle θ can be varied from zero to 90 degrees in order to maximize phase matching conditions with optical NFT 132 for efficient plasmon excitation. Waveguide 138 can be a ridge waveguide or a thin film planar waveguide.

Another approach for delivering energy to an optical NFT for HAMR is shown in FIG. 4C. In FIG. 4C energy source 136 is parallel to recording medium 134, for instance, by mounting energy source 136 on the side of a read/write head to satisfy height limitations. Energy source 136 delivers energy to tapered waveguide 138 with coupling elements 130 and 131 as schematically indicated by arrow 137. Waveguide 138 in turn, delivers energy to mirror 140 that redirects energy to optical NFT 132 as schematically indicated by arrows 135. Optical NFT 132, in turn, concentrates the electromagnetic energy to a small spot on recording medium 134, indicated by arrow 139, to assist magnetic recording. Waveguide 138 can be a ridge waveguide or a thin film planar waveguide.

In another aspect of the invention, another method to directly deliver optical energy to a NFT to assist magnetic recording in HAMR is to use a two dimensional planar waveguide that is not tapered and has a thicker core. In tapered waveguides, such as shown schematically in FIGS. 4A-4C, the tapers are designed in order to match the mode profile of the electromagnetic wave emanating from the waveguide to the coupling area of the optical NFT, preferably less than 200 nm across. For a waveguide with core and cladding indices of 2.1 and 1.6 respectively, and a 500 nm core, the mode profile is about 750 nm at full width at half maximum (FWHM) for the first TE mode. This will not efficiently couple with a 200 nm feature on an optical NFT. In this case, coupling the energy in the waveguide with an optical NFT proximate the waveguide is accomplished by beveling the end of the waveguide and coating the bevel with a dielectric and metal coating to deflect the energy out of the waveguide towards the NFT. The coated bevel at the end of this waveguide overcomes that limitation and allows efficient coupling to a 200 nm optical NFT dimension. A distinct advantage of the beveled waveguide is that the waveguide can be closely integrated with the magnetic circuit of a writer pole and associated optical NFT to form a HAMR device structure that is compact and easy to manufacture.

Figure 5:
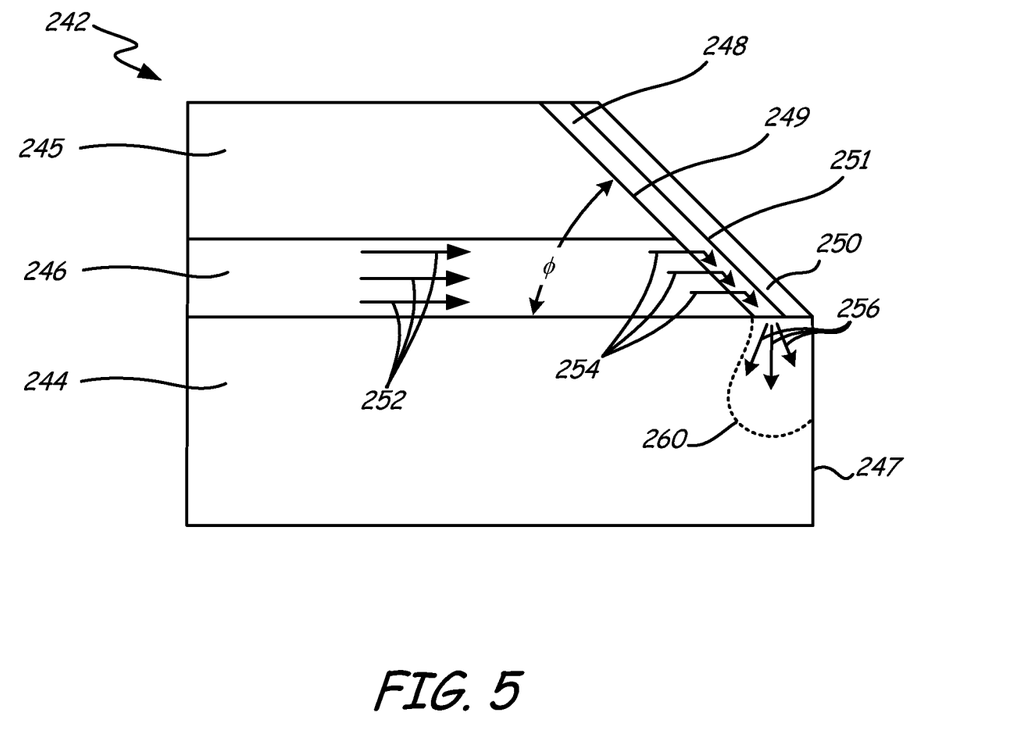
FIG. 5 is a schematic diagram of the cross section of a beveled waveguide.

A schematic diagram of the cross section of a beveled waveguide is shown in FIG. 5. Beveled waveguide 242 comprises bottom cladding layer 244, top cladding layer 245, and core layer 246. Electromagnetic energy is shown schematically propagating in core layer 246 by arrows 252. Beveled end 249 of waveguide 242 needs to be coated in order to deflect electromagnetic energy. A two layer coating is sufficient to deflect electromagnetic energy at beveled end 249. Beveled end 249 is preferably coated with low index dielectric layer 248 and metallic layer 250. Low index dielectric layer 248 is preferably $SiO_2$. Other low index dielectric materials such as $Al_2O_3$, MgO, and others known to those in the art can be employed. Metallic layer 250 is preferably gold, but other metals such as platinum, silver, and others known to those in the art can be employed. During operation, electromagnetic energy in waveguide 242 impinges on coated beveled surface 249. Surface plasmons are generated at metal/dielectric interface 251. The plasmons propagate down metal/dielectric interface 251 as indicated by arrows 254 until they emerge as concentrated energy in region 260 as indicated by arrows 256. A NFT proximate region 260 will couple with the electromagnetic radiation and direct the energy at air bearing surface 247 as evanescent radiation. Angle φ is adjusted such that surface plasmons generated at metal/dielectric interface 251 most efficiently couple with the NFT in region 260.

Figure 6:
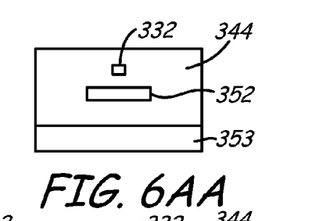
Figure 6A:
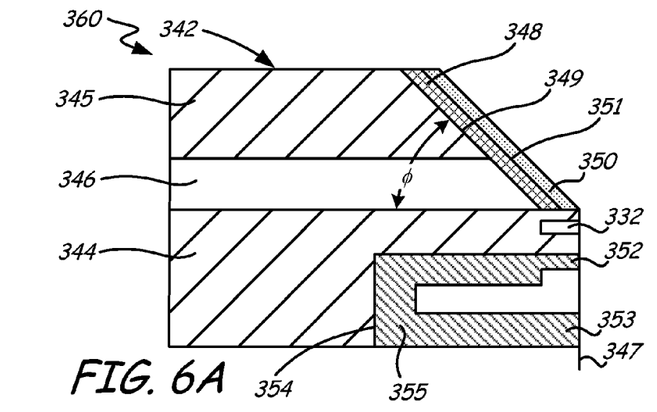
FIG. 6A is a schematic cross section of a HAMR transducer wherein the waveguide of FIG. 5 is proximate a magnetic writer.
Figure 6B:
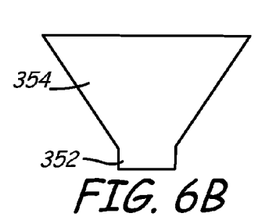
FIGS. 6B to 6I are schematic top views that illustrate the fabrication steps in the formation of the HAMR transducer shown in FIG. 6A.

Transducer 242 can be integrated with a NFT to concentrate energy at an ABS to heat a small region of a recording medium. The transducer and NFT can then be integrated with a magnetic write head to form a compact HAMR structure that can be easily manufactured using conventional processes known in the art. A schematic cross section of integrated HAMR transducer 360 is shown in FIG. 6A. HAMR transducer 360 comprises beveled waveguide 342 proximate optical NFT 332 and magnetic write circuit 354. During operation, electromagnetic energy in waveguide 342 focused at beveled surface 349 couples with optical NFT 332 that heats a recording medium (not shown) proximate ABS 347 to assist magnetic writing by write pole 352 of magnetic write circuit 354.

Beveled waveguide 342 comprises bottom cladding layer 344, top cladding layer 345, and core layer 346. Beveled surface 349 is coated with a two layer coating comprising a low index dielectric layer and a metallic layer. Beveled surface 349 is coated with low index dielectric layer 348, which, in turn, is coated with metallic layer 350 to enable beveled surface 349 to deflect electromagnetic energy in waveguide 342 toward optical NFT 332. Low index dielectric layer 348 is preferably $SiO_2$. Other low index dielectric materials, such as $Al_2O_3$, MgO and others known to those in the art can be employed. Second metallic layer 350 is preferably gold, but other metals such as platinum, silver, and others known to those in the art can be employed.

During operation, electromagnetic energy in waveguide 342 impinges on coated beveled surface 349. Surface plasmons are generated at metal/dielectric interface 351. The plasmons propagate down metal/dielectric interface 351 toward optical NFT 332 until they couple with optical NFT 332 and then emerge as evanescent radiation at ABS 347.

Angle φ is adjusted such that surface plasmons generated at metal/dielectric interface 351 couple efficiently with optical NFT 332. In the embodiment shown in FIG. 6A, optical NFT 332 is separated from dielectric layer 346 by cladding 344. Optical NFT 332 can also contact metallic layer 350.

FIG. 6A shows magnetic circuit 354 comprising write pole 352, return pole 353, and back gap region 355. The remainder of magnetic circuit 354 such as energizing coils, insulating layers, magnetic shields, etc. are not shown in FIG. 6A for clarity. Magnetic write pole 352 is constructed of various magnetic materials and is preferably constructed of a material having a low coercivity and a high moment such as CoFe. Return pole 353 and the remainder of magnetic circuit 354 can be constructed of various magnetic materials such as NiFe or some other suitable magnetic material.

An air bearing surface view of one aspect of the invention is shown in FIG. 6AA. In FIG. 6AA, NFT 332 is separated from magnetic write pole 352 by bottom cladding layer 344. An air bearing surface view of another aspect of the invention is shown in FIG. 6AAA. In FIG. 6AAA, NFT 332 is positioned much closer to magnetic write pole 352. A channel is formed in magnetic write pole 352 such that NFT 332 and magnetic write pole 352 are proximate each other and still separated by bottom cladding layer 344. In this aspect of the invention, the optical and magnetic energies are preferably superimposed and the optical spot and magnetic bit approximately coincide during writing.

Figure 6C:
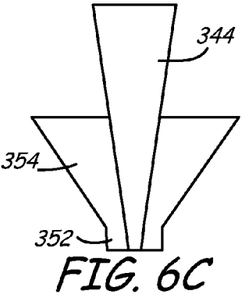
Figure 6D:
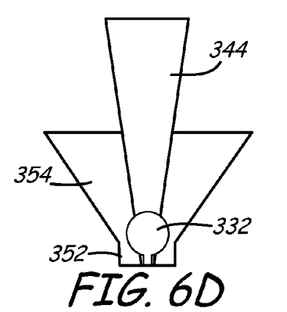
Figure 6E:
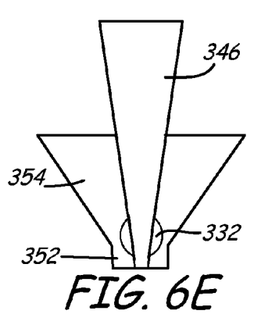
Figure 6F:
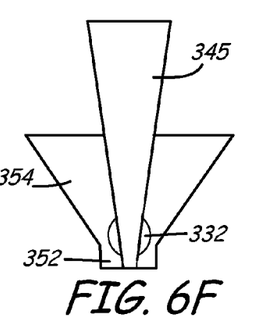
Figure 7:
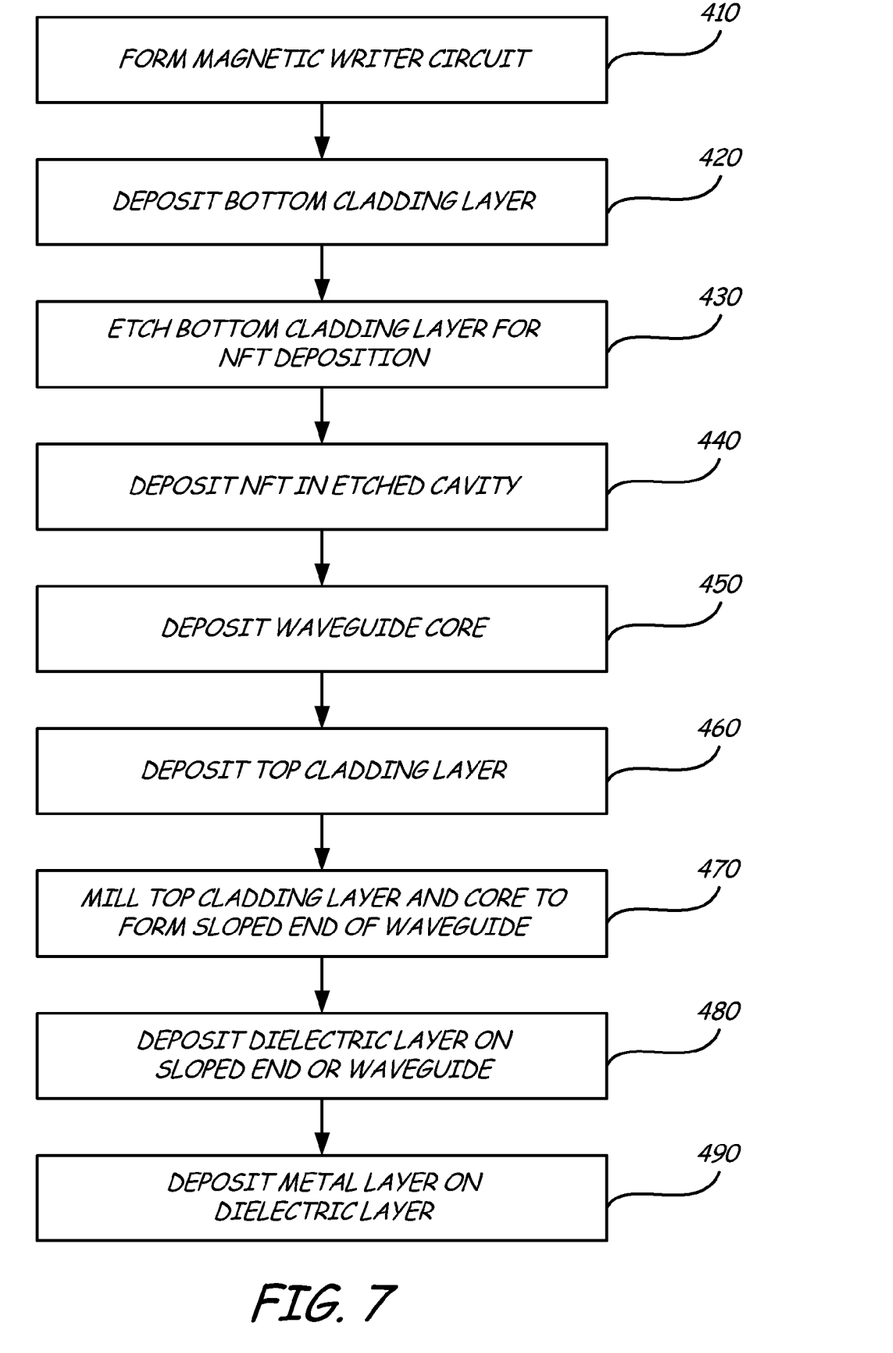
FIG. 7 is a flow chart showing the steps in the formation of a waveguide with beveled termination.

The steps to form HAMR transducer 360 shown in FIG. 6A are listed in FIG. 7 and are illustrated in the top views of FIGS. 6B to 6I. All patterns and shapes used during the formation of HAMR transducer 360 are formed using, for instance, photolithographic masking, stripping, etching, physical vapor deposition, ion beam machining and other techniques known in the art. Magnetic write circuit 354 is first formed on a substrate as shown in the top view of FIG. 6B (step 410). The circuit contains high moment write pole 352, return pole 353 (not shown), back gap region 355 (not shown) and the remainder of magnetic write circuit 354 such as energizing coils, insulating layers, magnetic shield, etc (not shown). Next, bottom cladding layer 344 is deposited as shown in FIG. 6C (step 420). Bottom cladding layer 344 is then etched to form a cavity for optical near field transducer deposition (step 430). Optical NFT 332 is then deposited in the etched cavity as shown in FIG. 6D (step 440). Waveguide core 346 is then deposited on bottom cladding layer 344 and optical NFT 332 as shown in FIG. 6E (step 450). Top cladding layer 345 is then deposited on core layer 346 as shown in FIG. 6F (step 460).

Figure 6G:
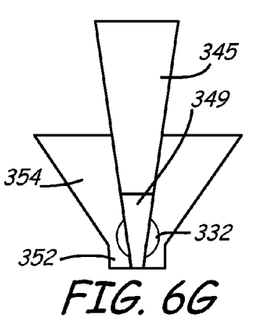
Figure 6H:
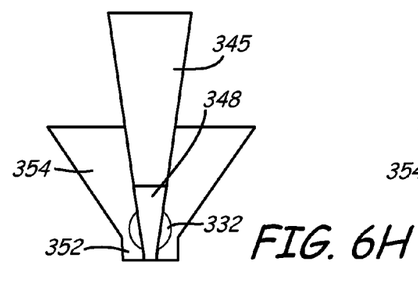
Figure 6I:
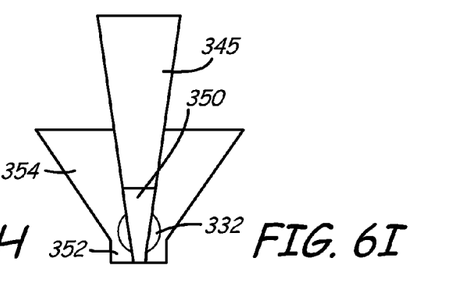

The end of waveguide 342 is then beveled by ion beam etching or other means of material removal to form beveled surface 349 as shown in FIG. 6G (step 470). Dielectric layer 348 is then deposited on beveled surface 349 as shown in FIG. 6H (step 480). Finally, metal layer 350 is deposited on dielectric layer 349 as shown in FIG. 6I (step 490) to form HAMR transducer structure 360 wherein electromagnetic energy from waveguide 342 strikes beveled surface 349 and introduces plasmons at dielectric/metallic interface 351 that couple with the surface of optical NFT 332 and emanate as a small spot of evanescent radiation that heats a recording medium proximate ABS 347 to assist switching by write pole 352.

Figure 8:
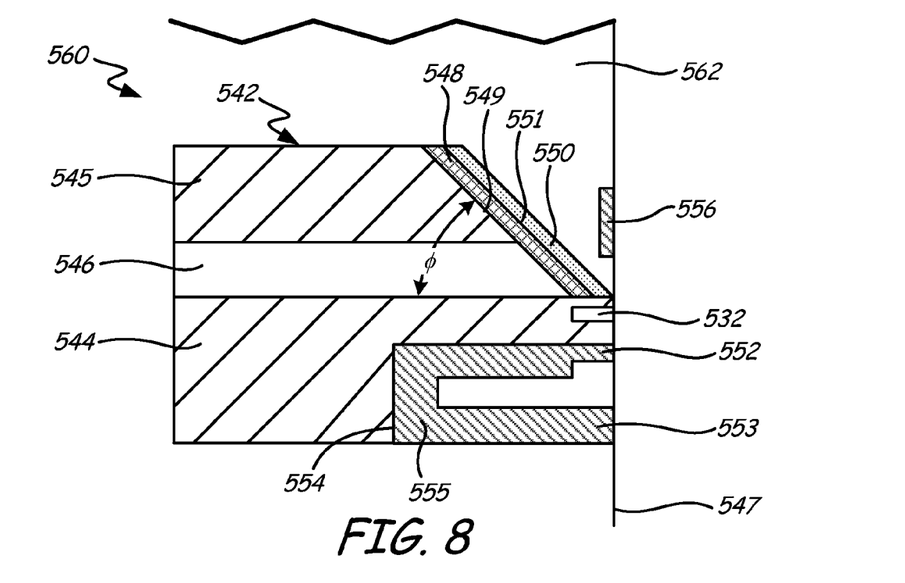
FIG. 8 is a schematic cross section of a HAMR transducer.

Another aspect of the invention is shown in FIG. 8. In FIG. 8 an additional return pole 556 has been added to the magnetic circuit of HAMR transducer 560. Return pole 556 has a dual purpose. First, it acts as another return pole providing a larger return pole in the magnetic write circuit. Second, it serves as a contact pad that protects NFT 532 and write pole 552 from accidental contact with the recording medium.

HAMR transducer 560 comprises beveled waveguide 542 proximate optical NFT 532 and magnetic write circuit 554. During operation the electromagnetic energy in waveguide 542 focused at beveled surface 549 couples with optical NFT 532 that heats a recording medium (not shown) proximate ABS 547 to assist magnetic writing by write pole 552 of magnetic write circuit 554.

Beveled waveguide 542 comprises bottom cladding layer 544, top cladding layer 545, and core layer 546. Beveled surface 549 is coated with a two layer coating comprising a low index dielectric layer and a metallic layer. Beveled surface 549 is coated with low index dielectric layer 548 which, in turn, is coated with metallic layer 550 to enable beveled surface 549 to deflect electromagnetic energy in waveguide 542 toward optical NFT 532. Low index dielectric layer 548 is preferably $SiO_2$. Other low index dielectric materials such as $Al_2O_3$, MgO and others known to those in the art can be employed. Second metallic layer 550 is preferably gold but other metals such as platinum, silver and others known to those in the art can be employed.

During operation, electromagnetic energy in waveguide 542 impinges on coated beveled surface 549. Surface plasmons are generated at metal/dielectric interface 551. The plasmons propagate down metal/dielectric interface 551 toward optical NFT 532 until they couple with optical NFT 532 and then emerge as evanescent radiation at ABS 547. Angle φ is adjusted such that surface plasmons generated at metal/dielectric interface 551 couple efficiently with optical NFT 532. In the embodiment shown in FIG. 8, optical NFT 532 is separated from dielectric layer 546 by cladding 544. Optical NFT 532 can also contact metallic layer 550.

FIG. 8 shows magnetic circuit 554 comprising write pole 552, return poles 553 and 556, and back gap region 555. As noted above, return pole 556 has a dual purpose. First, it acts as another return pole. Second, it serves as a contact pad that protects near field transducer 532 and write pole 552 from accidental contact with the recording medium. Return pole 556 is separated from beveled waveguide 542 by dielectric material 562. The remainder of magnetic circuit 554 such as energizing coils, insulating layers, magnetic shield, etc. are not shown in FIG. 8 for clarity. Magnetic write pole 552 is constructed of various magnetic materials and is preferably constructed of a material having a low coercivity and a high moment such as CoFe. Return pole 553 and the remainder of magnetic circuit 554 can be constructed of various magnetic materials such as NiFe or some other suitable magnetic material.

Figure 8A:
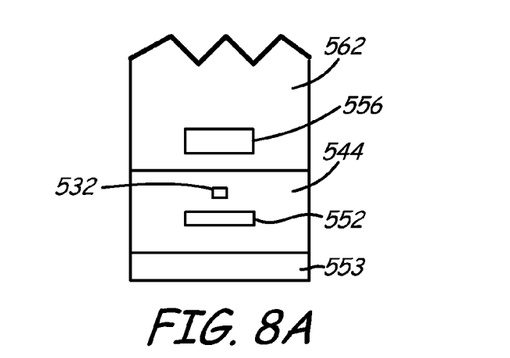
FIG. 8A is an air bearing surface view of one aspect of the invention.

An air bearing surface view of one aspect of the invention is shown in FIG. 8A. In FIG. 8A, NFT 532 is separated from magnetic write pole 552 and magnetic return pole 556 by cladding layer 544 and other dielectric material 562. Dielectric material 562 can comprise $Al_2O_3$, $SiO_2$ or other dielectric materials known in the art. Another aspect of the invention is shown in FIG. 8AA. In FIG. 8AA, NFT 532 is positioned much closer to magnetic write pole 552. A channel is formed in magnetic write pole 552 such that NFT 532 and magnetic write pole 552 are proximate each other and still separated by bottom cladding layer 544. In this configuration, the optical and magnetic energies are preferably superimposed such that the optical spot and magnetic bit approximately coincide during writing.

Figure 9A:
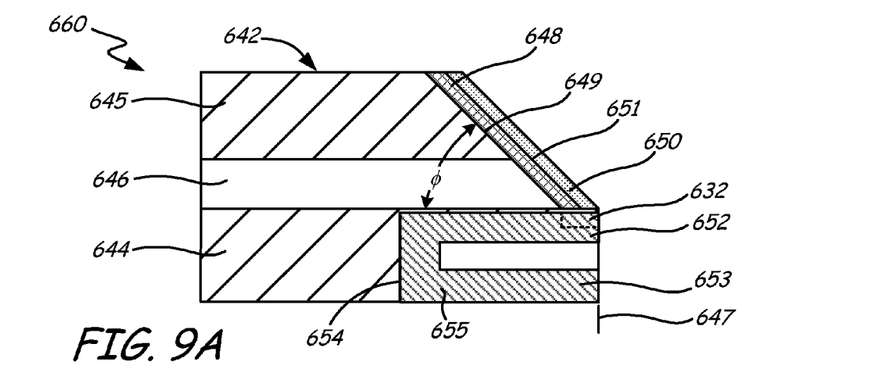
FIG. 9A is a schematic cross section of another HAMR transducer.
Figure 9B:
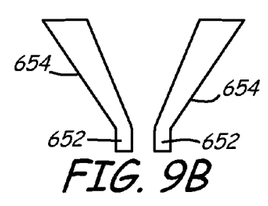
FIGS. 9B to 9I are schematic top views that illustrate the fabrication steps in the formation of the HAMR transducer shown in FIG. 8A.

Another HAMR transducer is shown in FIG. 9A, which is a schematic cross section of HAMR transducer 660. HAMR transducer 660 comprises beveled waveguide 642 proximate optical NFT 632 and magnetic write circuit 654 such that optical NFT 632 is between write poles 652 such that the heated spot and magnetically switched regions substantially overlap during operation. During operation, electromagnetic energy in waveguide 642 focused at beveled surface 649 couples with optical NFT 632 that heats a recording medium (not shown) proximate ABS 647 to assist magnetic writing by write poles 652 of magnetic write circuit 654.

Beveled waveguide 642 comprises bottom cladding layer 644, top cladding layer 645, and core layer 646. Beveled surface 649 is coated with a two layer coating comprising a low index dielectric layer and a metallic layer. Beveled surface 649 is coated with low index dielectric layer 648 which, in turn, is coated with metallic layer 650 to enable beveled surface 649 to deflect electromagnetic energy in waveguide 642 toward optical NFT 632. Low index dielectric layer 648 is preferably $SiO_2$. Low index dielectric materials, such as $Al_2O_3$, MgO and others known to those in the art can be employed. Second metallic layer 650 is preferably gold but other metals such as platinum, silver and others known to those in the art can be employed.

During operation electromagnetic energy in waveguide 642 impinges on coated beveled surface 649. Surface plasmons are generated at metal/dielectric interface 651. The plasmons propagate down metal/dielectric interface 651 toward optical NFT 632 until they couple with optical NFT 632 and then emerge as evanescent radiation at ABS 647. Angle φ is adjusted such that surface plasmons generated at metal/dielectric interface 651 most efficiently couple with optical near field transducer 632. In the embodiment shown in FIG. 9A, optical NFT 632 is separated from dielectric layer 646 by a thin layer of cladding 644. In another embodiment, optical NFT 632 can contact metallic layer 650.

FIG. 9A shows magnetic circuit 654 of HAMR transducer 660 comprising write pole 652, return pole 653 and back gap region 655. The remainder of magnetic circuit 654 such as energizing coils, insulating layers, magnetic shields, etc are not shown in FIG. 9A for clarity. Magnetic write pole 652 is constructed with various magnetic materials and is preferably constructed of a material having a low coercivity and a high moment such CoFe. Return pole 653 and the remainder of magnetic circuit 654 can be constructed of various magnetic materials such as NiFe or some other suitable magnetic material.

Figure 9C:
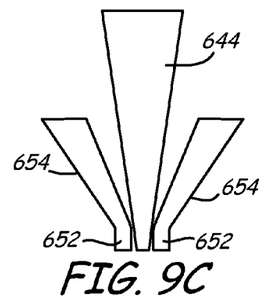
Figure 9D:
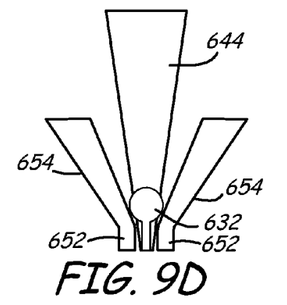
Figure 9E:
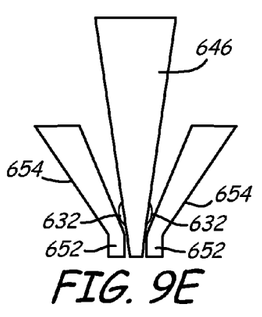
Figure 9F:
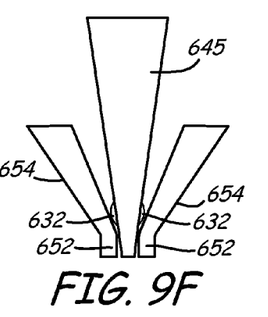

The steps to form HAMR transducer 660 shown in FIG. 9A are listed in FIG. 7 and illustrated in the top views of FIGS. 9B-9I. All patterns and shapes used during the formation of the HAMR structure are formed using, for instance, photolithographic masking, stripping, etching, physical vapor deposition (PVD), ion beam machining and other techniques known in the art. Magnetic write circuit 654 is first formed on a substrate as shown in the top view of FIG. 9B (step 410). The circuit contains high moment write poles 652, return pole 653 (not shown) back gap region 655 (not shown), and the remainder of magnetic write circuit 654 such as energizing coils, insulating layers, magnetic shields, etc (not shown). Next, bottom cladding layer 644 is deposited as shown in FIG. 9C (step 420). Bottom cladding layer 644 is then etched to form a cavity for optical near field transducer deposition (step 430) between write poles 652. Optical NFT 632 is then deposited in the etched cavity between write poles 652 as shown in FIG. 9D (step 440). Waveguide core 646 is then deposited on bottom cladding layer 644 and optical NFT 632 as shown in FIG. 9E (step 450). Top cladding layer 645 is then deposited on core layer 646 as shown in FIG. 9F (step 460).

Figure 9G:
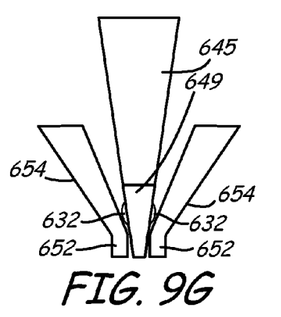
Figure 9H:
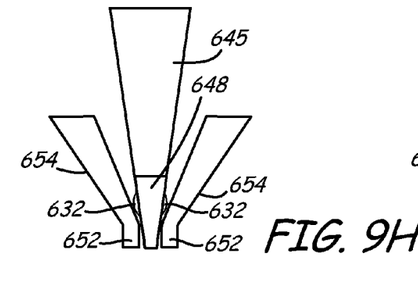
Figure 9I:
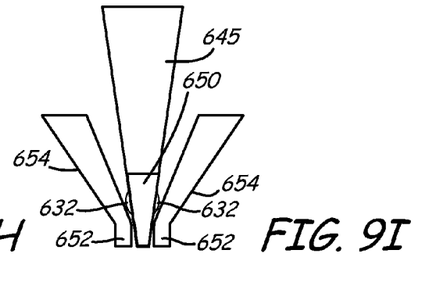

The end of waveguide 642 is then beveled by ion beam etching or other means of material removal to form beveled surface 649 as shown in FIG. 9G (step 470). Dielectric layer 648 is then deposited on beveled surface 649 as shown in FIG. 9H (step 480). Finally, metal layer 650 is deposited on dielectric layer 648 as shown in FIG. 9I (step 490) to form HAMR transducer structure 660, wherein electromagnetic energy from waveguide 642 strikes beveled surface 649 and introduces plasmons at dielectric/metallic interface 651 that couple with the surface of optical NFT 632 and emanate as a small spot of evanescent radiation that heats a recording medium proximate ABS 647 to assist switching by write poles 652.

Figure 10A:
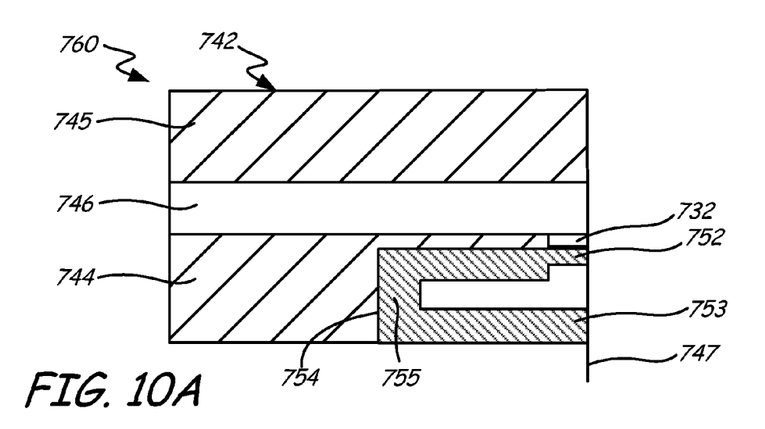
FIG. 10A is a schematic cross section of another HAMR transducer.
Figure 10B:
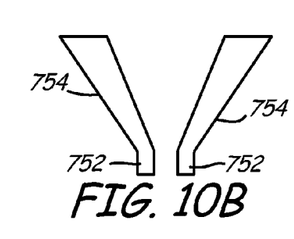
FIGS. 10B to 10F are schematic top views that illustrate the fabrication steps in the formation of the HAMR transducer shown in FIG. 10A.

Another HAMR transducer 760 is shown in FIG. 10A. HAMR transducer 760 comprises an optical NFT proximate a waveguide and magnetic write circuit as described above but the waveguide end is not beveled and the energy in the waveguide core directly couples with the optical NFT that is in contact with the core. Waveguide 742 comprises bottom cladding layer 744, top cladding layer 745, and core layer 746. HAMR transducer 760 comprises waveguide 742 with waveguide core 746 proximate optical NFT 732 and magnetic write circuit 754. During operation, electromagnetic energy in waveguide 742 focused at ABS 747 couples with optical NFT 732 that heats a recording medium (not shown) proximate ABS 747 to assist magnetic writing by write poles 752 of magnetic write circuit 754.

FIG. 10A shows magnetic circuit 754 comprising write pole 752, return pole 753 and back gap region 755. The remainder of magnetic circuit 754 such as energizing coils, insulating layers, magnetic shields, etc are not shown in FIG. 10A for clarity. Magnetic write pole 752 is constructed of various magnetic materials and is preferably constructed of a material having a low coercivity and a high moment such as CoFe. Return pole 753 and the remainder of magnetic circuit 754 can be constructed of various magnetic materials such as NiFe or some other suitable magnetic material.

Figure 10C:
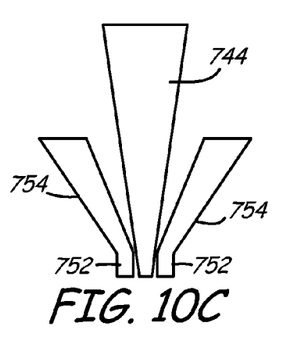
Figure 10D:
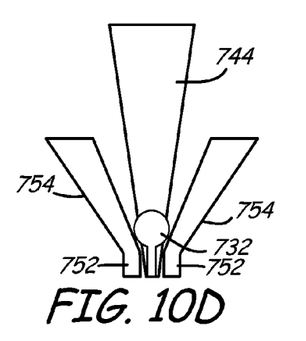
Figure 10E:
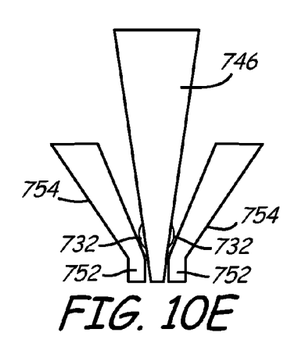
Figure 10F:
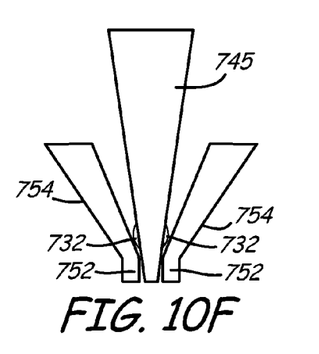
Figure 11:
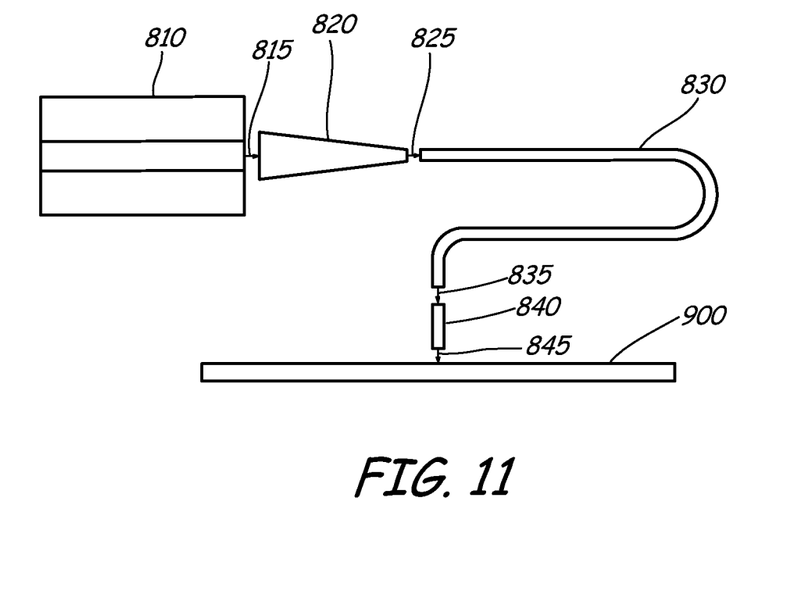
FIG. 11 is a schematic illustration of a curved waveguide delivering energy to a near field transducer proximate an associated recording medium.

The steps to form HAMR transducer 760 shown in FIG. 10A are listed in FIG. 7 and illustrated in the top views of FIG. 10B to 10F. All patterns and shapes used during the formation of the HAMR transducer are formed using, for instance, photolithographic masking, stripping, etching, physical vapor deposition, ion beam machining and other techniques known in the art. Magnetic write circuit 754 is first formed on a substrate as shown in the top view of FIG. 10B (step 410). The circuit contains high moment write poles 752, return pole 753 (not shown), back gap region 755 (not shown) and the remainder of magnetic writer circuit 754 such as energizing coils, insulating layers, magnetic shields, etc (not shown). Next, bottom cladding layer 744 is deposited as shown in FIG. 10C. Bottom cladding layer 744 is then etched to form a cavity for optical near field transducer deposition (step 430) proximate write pole 752. Optical NFT 732 is then deposited in the etched cavity between write pole tips 752 as shown in FIG. 10D (step 440). Waveguide core 746 is then deposited on bottom cladding layer 744 and NFT 732 as shown in FIG. 10E (step 450). Finally, top cladding layer 745 is deposited on core layer 746 as shown in FIG. 10F (step 460). Coupling of energy in core layer 746 to optical near field transducer 732 is by direct contact of optical NFT 732 to core layer 746, thereby generating surface plasmons on NFT 732. The plasmons emit evanescent radiation which emanates from the tip of optical NFT 732 to heat a recording medium proximate ABS 747 to facilitate writing In another aspect of the invention, a versatile means to directly deliver electromagnetic energy to an optical NFT is by a curved waveguide. FIG. 11 illustrates energy source 810, delivering energy to NFT 840 proximate recording medium 900. Energy source 810 delivers electromagnetic energy indicated by arrow 815 to tapered waveguide 820 which, in turn, delivers energy indicated by arrow 825 to curved waveguide 830. Curved waveguide 830 delivers energy to optical NFT 840, indicated by arrow 835 which, in turn, delivers energy to recording medium 900 indicated by arrow 845. The geometry of FIG. 11 is similar to FIG. 4C which schematically shows energy source 810 parallel to recording medium 900, for instance, by mounting energy source 810 on the side of a read/write head to satisfy height limitations. In this case, curved waveguide 830 replaces a minor to direct energy at NFT 840. The shape of curved waveguide 830 is arbitrary. As a result, the use of a curved waveguide leads to a large number of efficient design iterations for HAMR.

Unlike previous solutions, the present invention teaches that energy can be delivered directly to optical NFTs using optical waveguides. Three types of waveguides are disclosed. The first is a two dimensional tapered waveguide. The second is a two dimensional planar straight waveguide with a thick core and a beveled end coated with dielectric and metallic layers that generate surface plasmons at a metal/dielectric interface that deliver optical energy to an optical NFT for heat affected magnetic recording. In one aspect, the straight waveguide has an untapered end that is in direct contact with an optical NFT. The third is a curved waveguide. All three types of HAMR transducers can be economically fabricated using procedures well established in the art.

Although the present invention has been described with reference to preferred embodiments, workers skilled in the art will recognize that changes may be made in form and detail without departing from the spirit and scope of the invention. The implementations described above and other implementations are within the scope of the following claims.

The invention claimed is:

1. A magnetic recording head comprising:
a write pole having a pole tip adjacent to an air bearing surface;
a return pole;
an optical near field transducer positioned adjacent the air bearing surface and the pole tip for exposing a portion of a magnetic storage medium to near field radiation; and
a waveguide for delivering optical energy to the near field transducer, wherein the waveguide has tapered coupling elements at each end to change an optical mode of the optical energy.

2. The magnetic recording head of claim 1, wherein the waveguide comprises a ridge waveguide.

3. The magnetic recording head of claim 2, wherein the ridge waveguide comprises a tapered waveguide.

4. The magnetic recording head of claim 1 wherein the waveguide has a core with a multiple trapezoidal cross section.

5. The magnetic recording head of claim 3, wherein the dimensions of a core of the tapered waveguide are reduced, from a cross-section of about 5,000 nm by about 1,000 nm to a cross-section of about 500 nm by about 200 nm, over a length of about 100 micrometers.

6. The magnetic recording head of claim 1 wherein the waveguide comprises a curved waveguide.

7. The magnetic recording head of claim 1 wherein the waveguide comprises a straight waveguide.

8. The magnetic recording head of claim 7, wherein:
the waveguide has a beveled end;
the beveled end is coated with a dielectric film and a metal film such that, when exposed to optical radiation, plasmons are excited at a metal/dielectric interface formed by the dielectric film and the metal film;
the waveguide is parallel to and proximate the optical near field transducer; and
plasmons excited at the metal/dielectric interface couple with the optical near field transducer.

9. The magnetic recording head of claim 7, wherein the optical near field transducer is parallel to the write pole tip.

10. The magnetic recording head of claim 1, wherein the optical near field transducer comprises a coupled nanorod.

11. A data storage device comprising:
a storage medium;
a recording head for writing data to the storage medium, the recording head including:
a waveguide for directly delivering energy to a near field transducer, wherein the waveguide has a tapered coupling element at one end to change an optical mode of the energy and a core with a rectangular or trapezoidal cross-section;
a write pole having a pole tip adjacent to an air bearing surface;
a return pole; and
an optical near field transducer positioned adjacent the air bearing surface for exposing a portion of the magnetic storage medium to high energy radiation.

12. The data storage device of claim 11, wherein the waveguide comprises a ridge waveguide.

13. The data storage device of claim 12, wherein the ridge waveguide comprises a tapered waveguide.

14. The data storage device of claim 11, wherein the waveguide comprises a curved waveguide.

15. The data storage device of claim 13, wherein the dimensions of a core of the tapered waveguide are reduced from a cross section of about 5,000 nm by about 1,000 nm to a cross section of about 500 nm by about 200 nm over a length of about 100 micrometers.

16. The data storage device of claim 11, wherein:
the waveguide has a beveled end;
the beveled end is coated with a dielectric film and a metal film such that, when exposed to optical radiation, plasmons are excited at a metal/dielectric interface formed by the dielectric film and the metal film;
the waveguide is parallel to and proximate the optical near field transducer; and
plasmons excited at the metal/dielectric interface couple with the near field transducer.

17. The data storage device of claim 16, wherein the optical near field transducer is parallel to and proximate the writer pole of the magnetic recording head.

18. The data storage device of claim 17, wherein the optical near field transducer comprises a coupled nanorod.

19. A device comprising:
a waveguide, parallel to and proximate an optical near field transducer, for delivering energy to the near field transducer,
wherein the waveguide has a core with a multiple trapezoidal cross section and tapered coupling elements to change an optical mode of the energy.

* * * * *